United States Patent
Weit

[11] 3,944,907
[45] Mar. 16, 1976

[54] ZERO DEADBAND FOUR-QUADRANT FULL-WAVE CONVERTER

[75] Inventor: James G. Weit, Pittsburgh; Charles W. Newcamp, Lower Burrell, both of Pa.

[73] Assignees: Control Systems Research, Inc., Pittsburgh, Pa.

[22] Filed: Sept. 9, 1974

[21] Appl. No.: 504,074

[52] U.S. Cl. .................. 321/13; 318/257; 318/624; 318/631
[51] Int. Cl.² .......................................... H02M 1/18
[58] Field of Search ............. 321/13, 27 R; 318/257, 318/331, 624, 631

[56] References Cited
UNITED STATES PATENTS

| | | | |
|---|---|---|---|
| 3,110,851 | 11/1963 | Plogstedt et al. | 318/631 |
| 3,439,246 | 4/1969 | Moritz | 318/257 |
| 3,579,080 | 5/1971 | Vollrath | 321/13 |
| 3,795,850 | 3/1974 | Grygera | 318/257 |
| 3,821,628 | 6/1974 | Caputo | 321/27 R |

*Primary Examiner*—William M. Shoop
*Attorney, Agent, or Firm*—Robert D. Yeager; Howard G. Massung

[57] ABSTRACT

A four-quadrant full-wave static converter having improved time response without current cross-over deadband. An alternating current wave is imposed on the direct current input signal, which generates gate pulses for appropriate thyristors at the desired firing angle. The applied alternating current signal can be of approximately the same magnitude as the converter deadband, so as the direct current signal varies from zero a portion of the control signal moves out of the deadband area. For fast response the magnitude of the alternating current signal can be greater than the deadband signal. As the magnitude of the direct current signal increases the relative magnitude of the alternating current signal is decreased, preventing a large DC component from being imposed on the supply during high current operations. Cycling of the imposed alternating current waves is synchronized with the firing angle point O to maintain system protection.

19 Claims, 8 Drawing Figures

ZERO DEADBAND FOUR-QUADRANT FULL-WAVE CONVERTER

BACKGROUND OF THE INVENTION

1. Field of the Invention

This invention relates to a four-quadrant converter which transfers power between a direct current and an alternating current system. More particularly, this invention discloses a four-quadrant full-wave static converter providing quick response without current crossover deadband delay.

2. Description of the Prior Art

A direct current motor may be operated in four possible modes: (1) as a motor with a clockwise rotation; (2) as a motor with counterclockwise rotation; (3) as a generator with clockwise rotation; and (4) as a generator with counterclockwise rotation. These modes of operation are referred to as quadrants. The four quadrants can be represented on a rectangular coordinate system with speed being indicated on the vertical axis and current being indicated on the horizontal axis so that clockwise motoring, with positive current and positive speed, is represented by quadrant 1, clockwise generating, with negative current and positive speed, is represented by quadrant 2, counterclockwise motoring, with negative current and negative speed, is represented by quadrant 3, and counterclockwise generating, with positive current and negative speed, is represented by quadrant 4.

A converter converts AC power to DC power to supply the load or when the load is acting as a generator converts DC power back from the motor and applies it to the AC lines. When the converter is changing DC generator power to AC line power, the converter is said to be inverting. Halfwave converters create DC current having a poor form factor and causing a DC component on an AC line which can interfere with circuit components are usually not desirable for supplying a rotating direct current load. A basic single-phase full-wave power converter utilizes four thyristors connected in a full-wave bridge rectifying configuration. A basic single-phase two-quadrant full-wave converter of this variety is capable of operation in quadrants 1 and 4 or, alternatively, in quadrants 2 and 3.

A converter of this type would be useful in applications such as a hoist. The converter would supply DC power to the hoist motor to lift the load vertically. This would be in the motoring mode, or quadrant 1. As the load is lowered, the motor acts as a generator while being rotated in the opposite direction feeding power back into the alternating current line.

For many operations, a four-quadrant single-phase full-wave power converter is necessary. Four-quadrant converters normally consist of a pair of two-quadrant converters interconnected in such a way that one group can conduct positive motor current and the other group can conduct negative motor current, thus providing for operation in four quadrants. For example, one simple thyristor group allows converter operation in quadrants 1 and 4 and the other group allows converter operation in quadrants 2 and 3. The four-quadrant converter is sometimes referred to as a back-to-back converter since the operation of each full-wave thyristor group has historically been considered independent. Note that operation in quadrants 1 and 4 is no different than operation in quadrants 2 and 3 other than the direction of current flow with respect to the DC load. A major problem which can occur with prior art four-quadrant converters occurs at the instant of changing polarity of the current. Once a thyristor has been turned on, it remains a short circuit until the current flow through it is reduced to 0. If selected thyristors in both groups are conducting simultaneously, a short circuit can occur across the affected thyristors. This type of failure is termed an "AC line shoot-through". This failure would cause a catastrophic failure of the power converter and is usually prevented by modifying the way the thyristors can be triggered. The drivers for the thyristors are modified to include a deadband region. This deadband region prevents rapid change in the current polarity.

Also, most prior art four-quadrants converters utilize some means of determining when the armature current is 0 and then waiting a predetermined time before allowing triggering of thyristors which conduct current of a different polarity. This usually involves expensive and complicated circuitry which provides a deadband region. The deadband region is made large enough so that when the signal calling for change in polarity of the armature current goes through 0, all thyristors remain off so that there can be assurance that both groups will not be firing or conducting simultaneously.

It is generally known that in continuous conduction the output voltage of a phase controlled static converter is a function only of the firing angle and AC line voltage. It is also known that in discontinuous conduction the output voltage is also a function of the load impedance and countervoltage. In continuous conduction the output voltage can be made to vary almost linearly with respect to the driver input voltage. When the discontinuous conduction region is reached the transfer function of output voltage versus driver input voltage takes on a new slope dependent on load impedance and countervoltage. This change in driver-rectifier gain which occurs when crossing between the continuous and discontinuous conduction regions presents difficulties in maintaining maximum response characteristics and stabilizing any closed loop system, which utilizes the driver-rectifier gain. Still generally the compensation which is used to stabilize the loop during discontinuous conduction limits the bandwidth which can be achieved in continuous conduction.

It is generally known that the effects of this gain change can be greatly reduced by creating a current overlap at zero motor current with back-to-back converters.

Historically, this has been achieved by utilizing back-to-back halfwave converters and basing both on slightly around the zero current area. The result is alternate polarity current pulses which add to a net zero DC value. Thus a finite conduction angle is achieved at zero current and the driver-rectifier characteristic is effectively linearized by the AC bias at low DC currents where extreme discontinuous conduction would otherwise occur. This same linearizing of the driver-rectifier transfer is achieved with the invention described but with the further advantages of full-wave conversion at higher current levels and reduced susceptibility to noise induced shoot-through which could cause failure of the converter.

SUMMARY OF THE INVENTION

An improved four-quadrant converter using a four-quadrant full-wave static converter, which is responsive to a direct current input signal for determining the thyristors to be fired and the firing angle, wherein an alternating current wave is imposed on the direct current input. This construction eliminates time delay in switching through the deadband area which is prevalent in prior art four-quadrant full-wave converters. The selected alternating current signal, which can be a square wave, is sized so that when the firing angle is 0, the alternating current wave just fits in the limits defined by the deadband area. As the DC signal, which selects the firing angle and proper thyristors, moves in either polarity, portions of the alternating current wave imposed on the DC signal rapidly move out of the deadband area activating the proper thyristors. The frequency of the AC signal wave is determined by the AC line frequency and the number of phases. The phase of the AC signal wave is selected to go through zero when the firing angle is zero. This prevents series related thyristors, which could permit an AC line shoot-through from being activated at the same time. Thus, the protection provided by the deadband area is still obtained while the time delay in moving through it is eliminated.

The amplitude of the alternating current wave which is imposed on the direct current firing angle signal is made to decrease as the firing angle increases. This prevents a large DC component from being present on the AC line during high current operation.

In another embodiment of the invention, desirable results can be obtained if the amplitude of the alternating current bias is large enough so that the peak values exceed the limits defined by the deadband. Then at 0 firing angle alternating polarity pulses occur, which yield an average value of 0 current. This provides for faster response and more stability in current depending feedback loops, either for control of the four-quadrant converter or other related circuits. The amplitude of the AC bias is decreased as the average value of the current flow increases, and at higher current values complete full wave operation is achieved; at lower current values some superior operating characteristics, which in the prior art could only be provided with halfwave converters are obtained. The disclosed system provides a dramatic increase in dynamic response near 0 current without a decrease in random noise rejection capability of the thyristor drivers. Though the description is given for a single phase converter it is to be understood that the teaching of this invention can readily be applied to multi-phase systems.

BRIEF DESCRIPTION OF THE DRAWINGS

For a better understanding of the invention, reference may be had to the preferred embodiment exemplary of the invention shown in the accompanying drawings in which:

FIG. 4 is a graph of wave shapes in relation to a deadband area illustrating simultaneous firing of thyristors, due to deadband cross-over in the different groups which can cause an AC line shoot-through;

DESCRIPTION OF THE PREFERRED EMBODIMENTS

Figure 1:
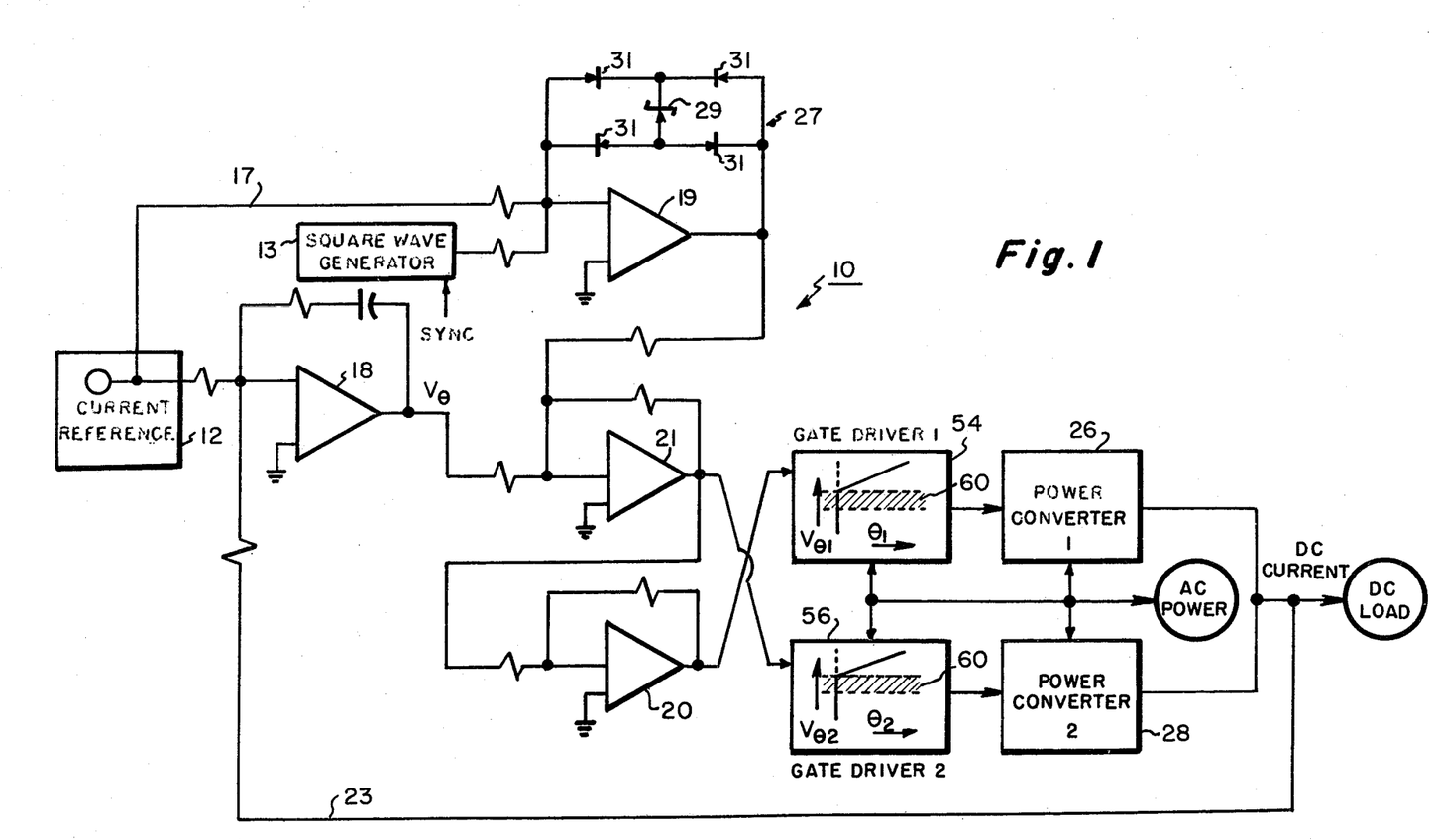
FIG. 1 is a drawing partially in schematic and partially in block diagram illustrating a system utilizing the teaching of the present invention.
Figure 2:
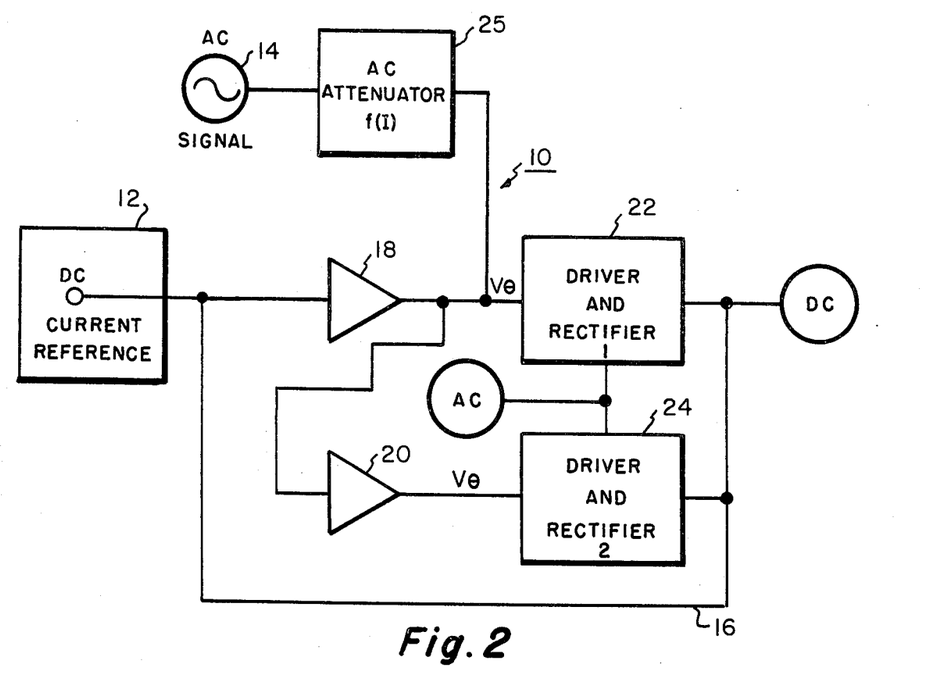
FIG. 2 is a block diagram of a converter utilizing the teaching of the present invention.

Referring now to the drawings and FIGS. 1 and 2 in particular, there is shown a four-quadrant full-wave converter system 10 utilizing the teaching of the present invention. A DC current reference 12 provides a direct current signal whose polarity and magnitude determine the group of thyristors, which permit current of the desired polarity to flow, to be fired and the firing angle. An alternating current signal from AC signal source 14 is imposed on the DC reference signal which is fed to the thyristor controls. The DC signal from current reference 12 is combined with a feedback signal supplied along line 16 to provide accurate system control and stability. This composite signal through suitable amplifiers 18 and inverter 20 is fed to driver and rectifier units 22 and 24. The application of an appropriate alternating signal of a proper frequency substantially improves the operation of the four-quadrant full-wave converter.

Figure 3:
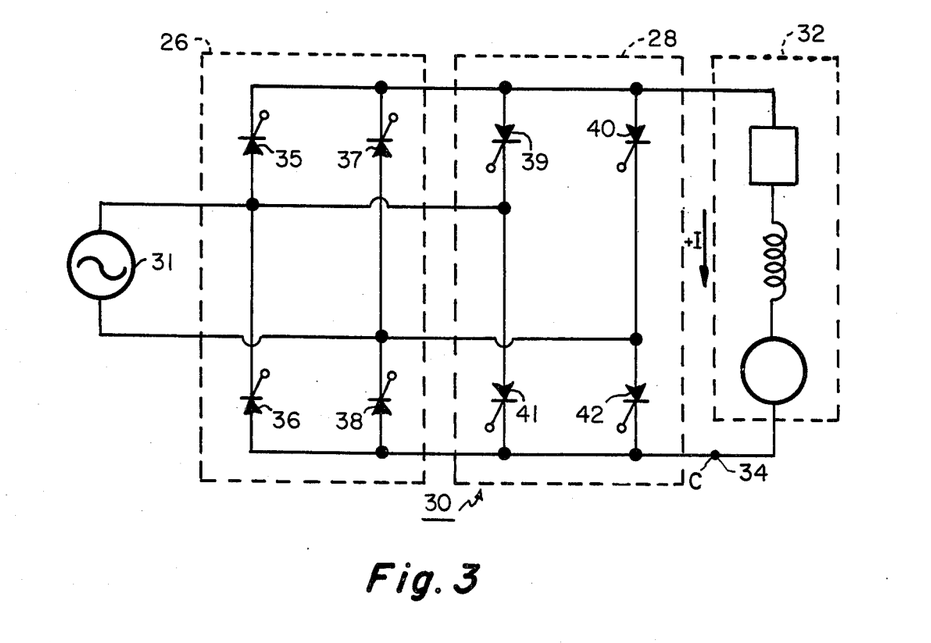
FIG. 3 is a schematic of the thyristor connection for a basic four-quadraant single-phase full-wave power converter.

Referring now to FIG. 3, the basic four-quadrant single-phase full-wave power converter unit as well knonw in the prior art is shown. The four-quadrant converter 30 consists of two two-quadrant converters 26 and 28 interconnected in such a way that one converter 26 can conduct positive full-wave motor current and the other converter 28 can conduct negative full-wave motor current. It should be remembered that each two-quadrant converter can conduct power in either direction without changing polarity of the current, but by changing polarity of the voltage. That is, the direct current motor 32 can operate either as a motor or generator while maintaining positive current flow with respect to a common point c indicated at 34. This is accomplished by reversing the polarity of the voltage. Thyristors 35, 36, 37 and 38 of two-quadrant converter 26 and 39, 40, 41 and 42 of two-quadrant converter 28 act as fast switches. Thyristors 35 through 42 can be switched on only when the anode potential is positive with respect to the cathode, and can be switched off only when current flow therethrough is reduced to 0. Conversion of the AC voltage to DC voltage is accomplished by connecting the alternating current line, from the AC power source 31, to the motor 32 or load at appropriate intervals of the alternating current line cycle. Depending on rotation and operation conditions, the motor 32 can supply either a positive or a negative counter electromotive force (CEMF). It must be understood that the motor countervoltage (CEMF) is directly proportional to the motor rotational speed. When the motor is spinning clockwise, CEMF is positive, and when the motor is spinning counterclockwise, CEMF is negative. When the motor 32 is not rotating, CEMF is 0. CEMF, as will be explained, can alter the times during which the thyristors 35–42 can be fired. Thyristors 35–42 can only be turned on whenever a gate pulse occurs when the anode is positive with respect to the cathode. As can best be understood with reference to FIG. 7, when the counter EMF, CEMF, forward biases the thyristors they can only be turned on when the line voltage exceeds CEMF. Once a thyristor 35 through 42 has been turned on it remains essentially a short circuit until the current flow through it is reduced to 0 by some means. The current through the thyristors 35 through 42 can be reduced to 0 by two ways:

1. During discontinuous conduction, the current can be reduced to 0 by the natural tendency for current reversal in the AC system; and
2. During continuous conduction, the current can be reduced to 0 in one set of thyristors when another set is turned on.

The point at which the thyristors are turned on or fired after the earliest point at which they can be fired, is often referred to as the angle of retard. At first it would appear that the maximum angle of retard is 180 electrical degrees, this however is not the case. If the CEMF is below the 0 axis, it can readily be appreciated that the angular position over which the thyristors can be fired is greater than 180°. Thus in FIG. 7, for maximum negative CEMF as indicated by line 53 the proper thyristor can be fired up to point 51. In usual practice, it is not necessary to fire thyristors at an angle of retard that is less than 45° or greater than 225°. This is a 180° range but not referenced from a line voltage 0 crossing.

For the purpose of understanding the operation of a power converter from the viewpoint of gate pulse generation, the angle of retard concept becomes cumbersome and instead the term firing angle will be used and will be designated $\theta$ (theta).

Figure 7:
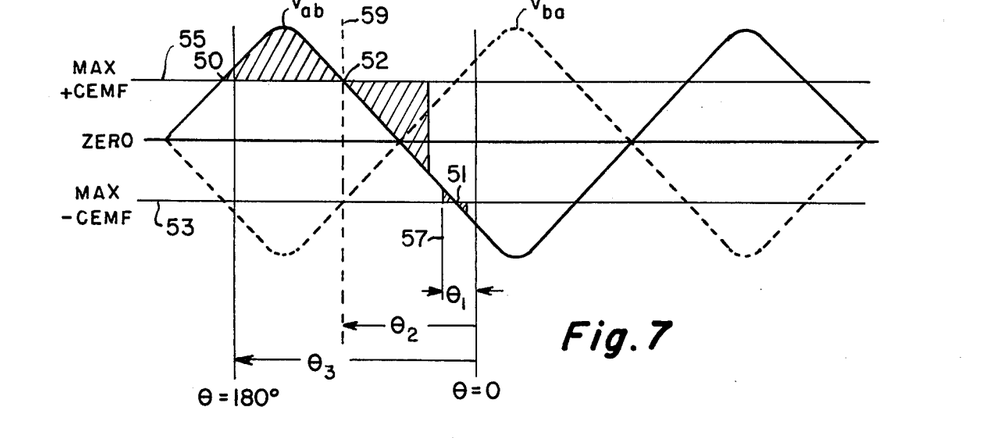
FIG. 7 shows firing angle selection for various CEMF.

Referring now to FIG. 7, there is shown the phase voltages and the highest CEMF obtainable in either direction. Line 55 represents a maximum positive CEMF, obtained with clockwise rotation of motor 32, and line 53 represents maximum negative CEMF, obtained with counterclockwise rotation. $\theta = 0$ is referenced just to the right of the point 51 where the phase voltage, $V_{ab}$ crosses the −CEMF line 53. Thus if gate pulses start at $\theta = 0$, no current will be produced. As the firing angle is advancing to $\theta = \theta 1$ indicated at line 57, the gate pulses occur while the thyristors are forward biased and motor current will be established. Note that with maximum negative CEMF 53, this occurs even when the portion of voltage wave $V_{ab}$ is below the zero axis. While the motor is rotating so as to produce the maximum positive CEMF, the firing angle must be advanced to $\theta = \theta 2$, indicated by line 59, to produce motor current. This is necessary since with the maximum pulse CEMF, $V_{ab}$ only exceeds maximum CEMF 55 between points 50 and 52. Maximum current can be obtained when the firing angle is advanced to around $\theta = \theta 3$.

Based on the above concept of firing angle $\theta$, the function of a gate driver circuit can now be described. The gate driver is a circuit that generates pulses at an angle $\theta$ as a function of an input voltage $V_\theta$. A gate driver can be used in the current loop as shown in FIG. 1 at 54 and 56. Because of the integral gain of the current loop summing amplifier 18, $V_\theta$ will become whatever value required to cause the current feedback to equal the current reference 12 output. On a four-quadrant converter 10, two gate drivers 54 and 56 are required. With two gate drivers controlling thyristors 35 through 42, there is a possibility that both drivers could produce gate pulses activating series related thyrsitors which could produce a short circuit path therethrough destroying the system. This could happen, for instance, if precautions are not taken when $V_\theta$ is equal to 0. When $V_\theta$ is equal to 0, both drivers could produce gate pulses if any changes occurred in the gate driver circuitry due to temperature, random drift, or noise pickup. This condition could cause a catastrophic failure of the power converter. Therefore the gate drivers 54 and 56 are normally modified as illustrated to include a deadband 60. The failure which this guards against is caused by improper thyristor firing. This failure called an AC line shoot-through can be understood by referring to FIG. 3. If thyristors 35 and 38 are conducting and at this time thyristors 41 and 40 are fired, a short circuit exists across the AC lines through thyristors 35, 38, 40 and 41 and the converter would be destroyed.

Figure 4:
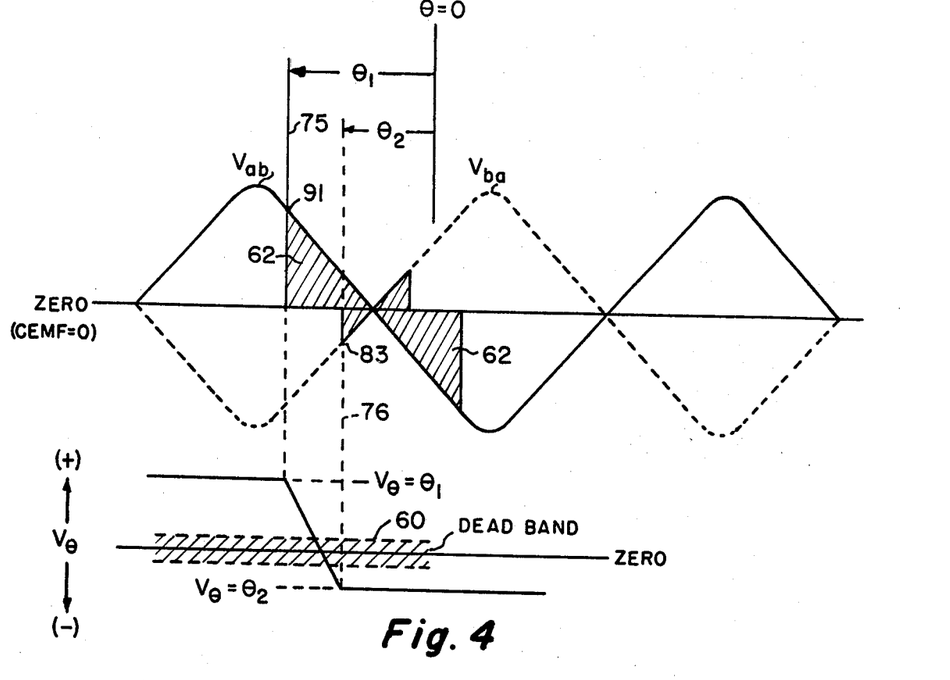
Figure 5:
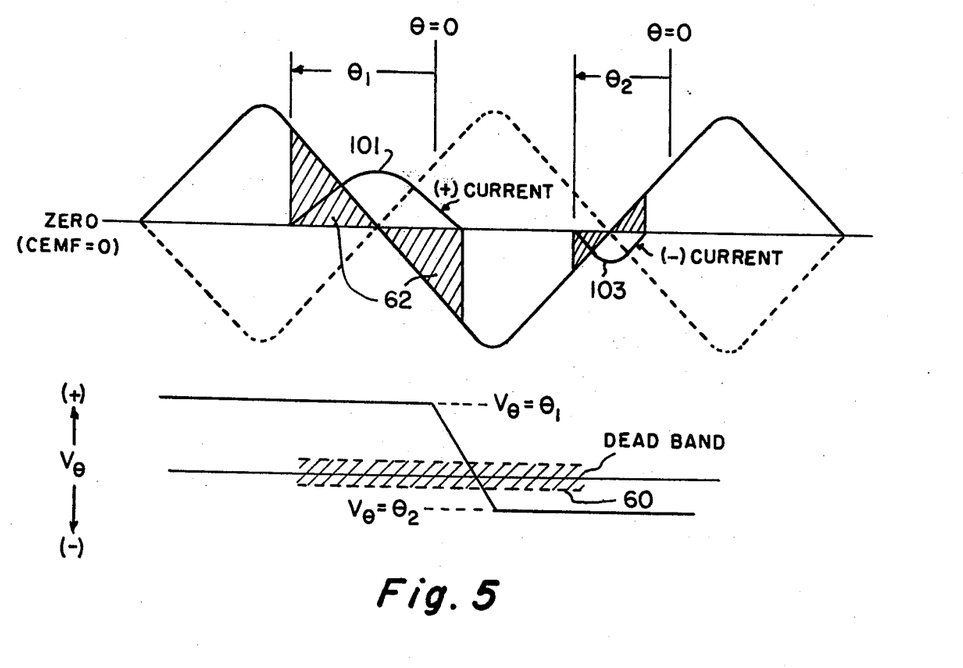
FIG. 5 is a view of a deadband and wave forms for the same thyristors fired in FIG. 4, but at a different deadband cross-over, illustrating at this point no shoot-through occurs.
Figure 8:
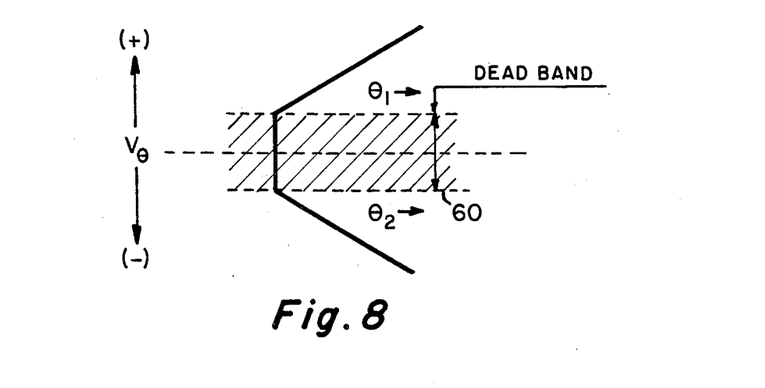
FIG. 8 illustrates the combined driver transfer function for a two-gate driver.

Combined transfer functions of the two-gate drivers 54 and 56 as used in FIG. 1 are shown in FIG. 8. $\theta 1$ pulses, in response to $+V_\theta$, cause converter 26, consisting of thyristors 35, 36, 37 and 38, to operate and $\theta 2$ pulses in response to sufficient $-V_\theta$, cause converter 28, consisting of thyristors 39, 40, 41 and 42 to operate. Thus, the current through converter 10 changes polarity as $V_\theta$ changes from positive to negative. There is another reason the deadband is required. In prior art converters depending on the rate at which $V_\theta$ is allowed to move through 0, as can be understood with reference to FIG. 4, a problem may result. If $V_\theta$ is at a level to produce positive current by firing converter 26 at point 91, thyristors 35 and 38 will conduct during a portion of the wave indicated at 62. An AC line shoot-through can possibly occur as shown in FIG. 4, when thyristors 35 and 38 fire at the point $\theta = \theta 1$. If thyristors 35 and 38 start conducting, they will continue to conduct until the current through them is equal to 0. The period of conduction can be determined by the length of area 62 indicated in FIG. 4. If $V_\theta$, which represents the current demand signal, quickly changes to a negative value after $\theta 1$, indicated by line 75, and passes through deadband 60 reaching a negative value $\theta 2$, at a time indicated by line 76, thyristors in group 28 such as 40 or 41 can fire causing a short circuit across the AC line through the conducting thyristors. To prevent this from occurring, prior art four-quadrant converters have included sensing circuitry which determines when the current goes to 0 and provides for a time delay before allowing the current to change polarity. As explained, if $V_\theta$ just after conduction is initiated at 91, moves negative and exceeds the negative deadband 60 before $V_{ab}$ crosses the 0 line, with CEMF equal to 0, then thyristor converter 28 will be fired at 83 and an AC line shoot-through will occur. Thus, it can be seen, that there is a relationship between the magnitude of the deadband and the rate at which $V_\theta$ is allowed to slew through the deadband 60. However, by referring to FIG. 5, it can be seen that the allowable slew rate is also a function of where on the AC wave the reversal in polarity of $V_\theta$ occurs. In FIG. 5, the reversal of $V_\theta$ takes place just after the point in the AC cycle where $\theta = 0$; that is near firing angle zero. Since $V_\theta$ reaches the top of the deadband before the next $\theta = 0$ point, the positive current pulse 101 shown will be the last to occur. The next current pulse will be initiated at $\theta = 2$ in the AC cycle and this will be a negative current pulse 103. In both FIGS. 4 and 5, $V_\theta$ changes polarity and magnitude in the same manner. The only difference being where in the AC cycle reversal occurred. In operation at the point indicated in FIG. 4, the reversal of $V_\theta$ resulted in an AC line shoot-through. In FIG. 5, the result was a reversal in the direction of current flow which is desirable rapid response. The operation as illustrated in FIG. 5 is desirable since the polarity of $V_\theta$ was reversed to achieve negative current. It can be seen in FIG. 4 that the rate at which $V_\theta$ was allowed to change was too great. In prior art practice the rate of change of $V_\theta$ is limited so a change of polarity occurs over several cycles of the AC line.

A considerable deadband is also placed in the driver transfer function. The combined results of both of these actions is a considerable delay in the current loop response during current reversal. This causes problems in the prior art and is eliminated by the disclosed invention.

By referring to FIG. 5, it can be seen that at $\theta = 0$, $V_\theta$ can change polarity at any desired rate faster than that shown. As shown in FIG. 5, if $V_\theta$ had not changed from positive to negative until the firing angle was equal to 0, there would have been no problem. That is, $V_\theta$ can rapidly switch polarity at the point where the firing angle $\theta = 0$ without there being any possibility of thyristors in group 26 and 28 forming a shorting path across the AC line. The disclosed invention utilizes this fact to provide a four-quadrant solid-state converter which has rapid response.

Figure 6:
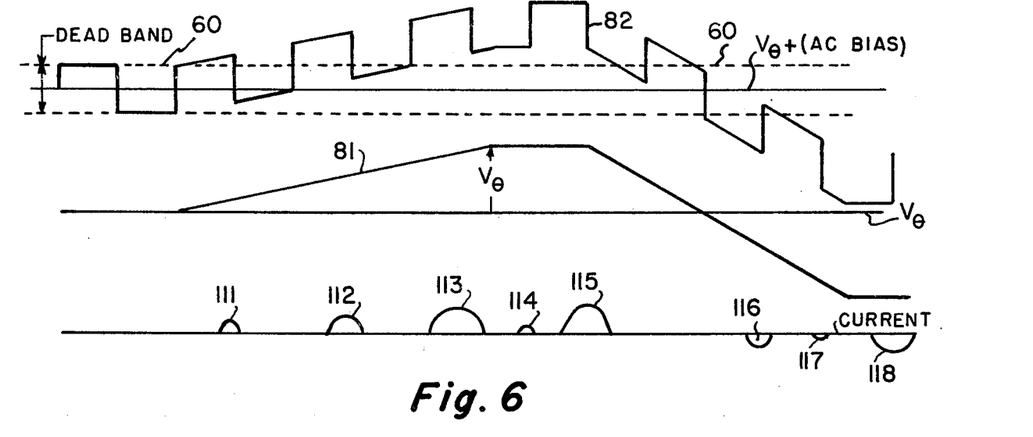
FIG. 6 is a rough illustration of the output current pulses, the DC control signal, and the composite control signal for phase and firing angle selection utilizing the teaching of the present invention.

Referring now to FIG. 6, there is shown schematically a drawing of a control signal wave 82 utilizing the teaching of the invention. The drawing of a normal prior art direct current wave $V_\theta$ is indicated at 81, a square alternating current wave is imposed on the normal DC control wave $V_\theta$, 81, and a composite wave 82 results. The square wave, as illustrated here, has a magnitude that is equal to the width of the deadband 60 so that as wave 81 becomes positive or negative portions of square wave 82 rapidly move out of the deadband area 60. The frequency and the phase of the square wave are selected so that each step occurs at a point where the firing angle $\theta$ is equal to 0. As explained in reference to FIG. 5, this can occur rapidly at the point where $\theta = 0$ without any fear of causing an AC line shoot-through. Initial current pulses are roughly indicated at 111 through 118 in the current portion of FIG. 6. It can be seen that as $V_\theta$ becomes positive, positive current pulses 111 through 115 are quickly formed and as $V_\theta$ becomes negative, current pulses 116 through 118 in the negative direction are quickly let through. $V_\theta$ can rapidly pass from a positive polarity to a negative polarity without any fear of causing an AC line shoot-through. By imposing a square wave of the described characteristics on the normal direct current firing angle control 81, the deleterious effects of the deadband 60 have almost been completely eliminated. The deadband 60 is essentially removed with respect to the input wave $V_\theta$. To prevent an unbalanced current pulse, the AC bias amplitude can be made to decay at higher current levels.

It has been observed in some applications that the current loop gain is a function of conduction angle $\theta$. In this case a single-phase full-wave converter with a 180° conduction angle would correspond to continuous conduction; that is the current would never be 0. In this continuous conduction, the maximum current loop gain is achieved. A gain reduction, however, is experienced as the conduction angle approaches 0. This gain change makes the current loop gain and subsequent outer loops difficult to stabilize over a full range of conduction angles. This problem has been eliminated in some prior art converters by using only halfwave converters and establishing 0 current as an AC current by alternating between converters each half cycle. In the prior art, this could be done only with halfwave drives. Thus at 0 output current a finite conduction angle is established. However, gain change at continuous current operation is greatly reduced. This is undesirable. Utilizing the teaching of the present invention, the same results can be obtained with a four-quadrant full-wave drive if the amplitude of the AC bias described previously is increased so that the peak values exceed the gate driver deadband 60. Then at 0 current, alternate polarity pulses occur which yield an average value of 0 current. As the amplitude of the bias is decreased as the average value of current is increased, at some point full wave continuous operation is achieved as desired. This system has the advantages of one halfwave converter at low current levels and the advantages of a full wave converter at high current levels.

The disclosed system has been built and tested and found to work as described. A dramatic increase in dynamic response near 0 current is obtained without a decrease in noise rejection capability of gate drives. Thus the disclosed four-quadrant full-wave converter has the advantages of the halfwave DC converter at low current levels but not the disadvantages, such as poor form factor and a large DC component produced on the AC line, at high current levels. In making the square wave change state at the position where firing angle $\theta = 0$, the problem of a quick change of polarity by DC current reference 12 is eliminated. This also eliminates expensive and complicated sensing circuitry required in the prior art to give a deadband.

Referring again to FIGS. 1 and 2, the operation will be explained in more detail. The firing angle $\theta$ is determined by a DC level which can rise up and down along a ramp base function. As the DC reference wave moves up or down along the ramp function appropriate gate signals are produced. In the disclosed invention an AC current signal is fed from the AC signal current source 14 to the input of driver and rectifier 22 directly and to the input of driver and rectifier 24 through an inverter 20. This imposes an alternating current signal on the normally DC input to the driver and rectifiers 22 and 24. FIG. 1 shows a square wave generator 13 connected to impose a square wave on the DC current reference signal from reference 12. Square wave generator 13 receives a synchronizing signal from the line so that the phase and frequency of the square wave are such that the square wave changes state only at points where the firing angle $\theta = 0$. The square wave is combined with the signal from current reference 12, which is fed along line 17, and combined and fed through amplifier 19. The output of amplifier 19 is fed to the input of amplifier 21. The signal from amplifier 19 at the input of amplifier 21 is combined with a signal from amplifier 18 which represents an error or difference between the current reference 12 signal and the feedback signal along line 23. The feedback loop is constructed so that the difference between the current reference output 12 and the feedback along line 23 is forced to 0. That is, the feedback loop tends to cause circuit 10 to eliminate any error between the current reference 12 and the feedback signals along line 23. The output of amplifier 21 is fed directly to gate driver 56 and to inverter amplifier 20. Thus, the inputs to gate driver 54 and 56 are a DC signal having an alternating current square wave imposed thereon, whose magnitude is equal to the combined deadband of gate driver 54 and 56. An AC attenuator 25, which operates as a function of the output current is provided to reduce the relative value of the alternating current component as the current increases. That is, the relative magnitude of the alternating current wave applied to the DC signal is a maximum when the current is near 0 and as the firing angle increases, causing increased output current, the magnitude of the alternating current is relatively decreased. This is accomplished in FIG. 1, showing the four-quadrant full-wave converter 10, by using a clipper circuit 27 connected around amplifier 19. The clipper circuit 27 which utilizes a zener diode 29 and four diodes 31 in effect reduces the bias amplitude of the alternating current square wave as a function of the current reference. Thus, for higher current levels the amplitude of the imposed alternating current wave is reduced to such a low magnitude that it has little effect on the output. Thus, it can be seen, the disclosed invention simplifies the problems in switching polarity of the current reference. The disclosed apparatus 10 provides quicker response and improved control compared with four-quadrant converters utilizing the prior art. The disclosed converter 10 provides improved operation with less components.

What is claimed is:

1. An improved four-quadrant converter comprising: four-quadrant full-wave static converter means for transferring power between a direct current load and an alternating current supply comprising a first plurality of triggerable devices which when triggered permit positive current flow and a second plurality of triggerable devices which when triggered permit negative current flow;
firing angle selecting means connected to said four-quadrant full-wave static converter means for selecting the firing angle and the appropriate polarity triggerable devices in accordance with the magnitude and polarity of a direct current input signal; and
alternating current signal means connected to said firing angle selecting means for imposing an alternating current signal, whose frequency is a function of line frequency and whose phase position is selected so polarity changes occur in proximity to a firing angle zero, on the direct current input signal.

2. An improved four-quadrant converter as claimed in claim 1 comprising:
alternating current signal control means for reducing the alternating current signal as the absolute magnitude of the current flow through said four-quadrant full-wave converter means increases.

3. An improved four-quadrant converter as claimed in claim 1 wherein:
said four-quadrant full-wave converter means is constructed so that a deadband exists for switching between said first plurality of triggerable devices and said second plurality of triggerable devices; and
said alternating current signal means peak-to-peak magnitude is equal to the levels defined by the deadband.

4. An improved four-quadrant converter as claimed in claim 1 wherein:
said four-quadrant full-wave converter means is constructed so that a deadband exists which must be surpassed by the magnitude of the input signal to said firing angle selecting means before said first plurality of triggerable devices or said second plurality of triggerable devices can be activated; and
said alternating current supply means provides an alternating current signal whose magnitude surpasses the deadband.

5. An improved four-quadrant converter as claimed in claim 4 comprising:
alternating current signal attenuating means for reducing the magnitude of the alternating current signal as the firing angle increases.

6. An improved four-quadrant converter as claimed in claim 1 wherein:
said alternating current signal means provides an alternating current signal whose frequency and phase position are dependent on the zero position of the firing angle.

7. An improved four-quadrant converter as claimed in claim 5 wherein:
said alternating current signal means provides a square wave alternating current signal which switches positions when the firing angle is in proximity to zero.

8. An improved four-quadrant converter as claimed in claim 6 wherein:
the alternating current signal amplitude is a maximum when the firing angle is equal to zero; and
amplitude control means for decreasing the magnitude of the alternating current signal as the firing angle increases.

9. An improved four-quadrant converter as claimed in claim 8 wherein:
the magnitude of the alternating current signal is equal to the magnitude of the deadband.

10. An improved four-quadrant converter as claimed in claim 8 wherein:
the magnitude of the alternating current signal is greater than the magnitude of the deadband.

11. An improved four-quadrant converter as claimed in claim 1 including feedback means to keep the output of said four-quadrant full-wave static converter means relatively constant with respect to the input to said firing angle selecting means.

12. A fast-response four-quadrant converter for transferring power between direct current apparatus and an alternating current system comprising:
a first plurality of triggerable devices connected between the direct current apparatus and the alternating current system for permitting positive current flow when triggered;
a second plurality of triggerable devices connected between the direct current apparatus and the alternating current system for permitting negative current flow when triggered;
gate driver means for triggering said first plurality of triggerable devices or said second plurality of triggerable devices in response to the polarity and magnitude of an input signal where the polarity of the input signal determines which of said first plurality of triggerable devices or said second plurality of triggerable devices can be triggered and the magnitude of the input signal determines the firing angle at which the selected triggerable devices are triggered;
input signal supply means connected to said gate driver means for applying an input signal which has an AC component and a DC component; and said gate driver means does not trigger said first plurality of triggerable devices until the magnitude of the input signal exceeds a first deadband level and does not trigger said second plurality of triggerable devices until the magnitude of the input signal exceeds a second deadband level.

13. A fast-response four-quadrant converter as claimed in claim 12 wherein:
the absolute magnitude of the first deadband level is equal to the absolute magnitude of the second deadband level.

14. A fast-response four-quadrant converter as claimed in claim 12 wherein:
the magnitude of the alternating current component of the input signal is equal to the magnitude of the first deadband level and the second deadband level.

15. A fast-response four-quadrant converter as claimed in claim 12 wherein:
said input signal supply means supplies an alternating current signal which is in the form of a square wave; and
the magnitude of the square wave is equal to the sum of the first deadband level and the second deadband level.

16. A fast-response four-quadrant converter as claimed in claim 12 wherein:
the AC component of the input signal is a square wave; and
the magnitude of the square wave extends beyond the deadband area defined by said first deadband level and said second deadband level.

17. A fast-response four-quadrant converter as claimed in claim 16 wherein:
the square wave switches polarity within a predetermined time of firing angle zero.

18. A fast-response four-quadrant converter as claimed in claim 12 comprising:
AC component attenuating means for attenuating the AC component as a function of the power flow between the direct current apparatus and the alternating current system.

19. A fast-response four-quadrant converter as claimed in claim 12 wherein:
said first plurality of triggerable devices comprises thyristors; and
said second plurality of triggerable devices comprises thyristors.

* * * * *